(12) United States Patent
Hatakawa et al.

(10) Patent No.: US 9,118,440 B2
(45) Date of Patent: Aug. 25, 2015

(54) CHANNEL INFORMATION COMPRESSING APPARATUS ADAPTED TO A MIMO SYSTEM AND METHOD

(75) Inventors: Yasuyuki Hatakawa, Fujimino (JP); Satoshi Konishi, Fujimino (JP); Tomoko Matsumoto, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 592 days.

(21) Appl. No.: 13/395,735

(22) PCT Filed: Aug. 26, 2010

(86) PCT No.: PCT/JP2010/064463
§ 371 (c)(1),
(2), (4) Date: Mar. 13, 2012

(87) PCT Pub. No.: WO2011/033912
PCT Pub. Date: Mar. 24, 2011

(65) Prior Publication Data
US 2012/0170641 A1  Jul. 5, 2012

(30) Foreign Application Priority Data
Sep. 16, 2009  (JP) .................. 2009-214855

(51) Int. Cl.
*H04L 1/00* (2006.01)
*H04N 19/60* (2014.01)
(Continued)

(52) U.S. Cl.
CPC .............. *H04L 1/0026* (2013.01); *G06T 9/007* (2013.01); *H04L 1/0029* (2013.01); *H04N 11/044* (2013.01); *H04N 19/00775* (2013.01)

(58) Field of Classification Search
CPC .................. H04L 1/0026; H04L 2025/03414; H04L 2025/03426; H04N 11/044; H04N 19/00775; G06T 9/007; H04B 7/0413
USPC .............................................. 375/240, 240.23
See application file for complete search history.

(56) References Cited

U.S. PATENT DOCUMENTS

2009/0154545 A1*  6/2009  Fallon et al. ................... 375/240
2009/0274220 A1   11/2009  Yun et al.
2009/0279419 A1* 11/2009  To et al. ........................ 370/208
(Continued)

FOREIGN PATENT DOCUMENTS

CN   101262264 A    9/2008
JP   2009-530899    8/2009
(Continued)

OTHER PUBLICATIONS

Vu et al., MIMO Wireless Linear Precoding, IEEE Signal Processin Magazine, pp. 86-105, Sep. 2007.
(Continued)

*Primary Examiner* — Curtis Odom
(74) *Attorney, Agent, or Firm* — Morgan, Lewis & Bockius LLP (57) ABSTRACT

A channel information compressing apparatus of the present invention includes a DCT part that performs discrete cosine transform on channel information (CSI) representing the state of a communication channel, and an information compressor that compresses high frequency components of information included in discrete cosine transform data which is produced by way of discrete cosine transform, thus compressing information while maintaining a good accuracy of channel information.

12 Claims, 2 Drawing Sheets

(51) Int. Cl.
  *G06T 9/00*   (2006.01)
  *H04N 11/04*   (2006.01)

(56) References Cited

U.S. PATENT DOCUMENTS

| | | | |
|---|---|---|---|
| 2010/0158146 | A1 | 6/2010 | Hamaguchi et al. |
| 2011/0060964 | A1 | 3/2011 | Furusawa et al. |
| 2011/0286501 | A1 | 11/2011 | Hamaguchi et al. |

FOREIGN PATENT DOCUMENTS

| | | |
|---|---|---|
| WO | 2008/126764 | 10/2008 |
| WO | 2008/132865 A1 | 11/2008 |
| WO | 2008/133185 | 11/2008 |
| WO | 2009/020174 | 2/2009 |
| WO | 2009/025221 | 2/2009 |

OTHER PUBLICATIONS

3GPPS TS 36.211 V.8.7.0; Evolved Universal Terrestrial Radio Access (E-UTRA); Physical Channels and Modulation (Release 8), May 2009.

Hatakawa et al., A study of CSI compression using DCT for MIMO-OFDM system, IEICE Technical Report, vol. 109, RCS2009-182, pp. 89-94, Dec. 2009.

Ericsson, E-UTRA Incremental CQI Reporting Using DCT Coding[online], 3GPP TSG-RAN WG2#55 R2-062858, Internet, <URL:http://www.3gpp.org/ftp/tsg_ran/WG2_RL2/TSGR2_55/Documents/R2-062858.zip>, Oct. 9, 2006.

Huawei, Sensitivity of DL/UL Performance to CQI-Compression with Text Proposal, TSG RAN WG1 ad hoc meeting on LTE R1-060228, Jan. 23, 2006, URL: http://www.3gpp.org/ftp/tsg_ran/WG1_RL1/TSGR_AH/LTE_AH_January-06/Docs/R1-060228.zip.

Japanese Office Action (with English translation) dated Feb. 25, 2014 for corresponding Patent Application No. JP 2013-109185.

3GPP TSG RAN WG1 #47, R1-063174, Analysis on DCT based CQI reporting Scheme (resubmission of R1-062954), LG Electronics, Nov. 6-10, 2006, Riga, Latvia.

Japanese Office Action dated Feb. 26, 2013 for corresponding International application No. 2009-214855.

3GPP TS 36.211 V.8.7.0, Evolved Universal Terrestrial Radio Access (E-UTRA); Physical Channels and Modulation (Release 8), May 2009.

Chinese Notice of Allowance dated Oct. 28, 2014, issued by the State Intellectual Property Office of China in Chinese Patent Application No. 201080041933.5.

* cited by examiner

CHANNEL INFORMATION COMPRESSING APPARATUS ADAPTED TO A MIMO SYSTEM AND METHOD

TECHNICAL FIELD

The present invention relates to a channel information compressing apparatus and method, a channel information decompressing apparatus and method, a receiver, and a transmitter.

The present application is a national stage of PCT International Application No. PCT/JP2010/064463, filed on Aug. 26, 2010 and claims priority on Japanese Patent Application No. 2009-214855 filed Sep. 16, 2009, the entire content of which is incorporated herein by reference.

BACKGROUND ART

It has been considered that next generation radio communication system adopts MIMO (Multiple Input Multiple Output) system. It is known (see NPL 1) that MIMO system performs precoding based on channel information (CSI: Channel State Information) representing the state of a signal transmission path (a communication channel), which a transmitter applies to its transmission data, thus providing an improved frequency utilization efficiency compared to a frequency utilization efficiency which is produced without implementing precoding.

Generally speaking, FDD (Frequency Division Duplex) allows a receiver to receive channel information, wherein the following two methods (1), (2) (see NPL 2) are known as a method for precoding transmission data based on channel information.
(1) A channel response matrix received by a receiver is transmitted to a transmitter, which in turn performs precoding suited to the channel response matrix.
(2) A codebook having indexes regarding a plurality of precoders is shared between a receiver and a transmitter, wherein an index of a precoder suited to a channel response matrix received by the receiver is transmitted to the transmitter, which in turn utilizes a precoder specified by the index.

CITATION LIST

Non Patent Literature

NPL 1: M. Vu, A. Paulraj, "MIMO Wireless Linear Precoding", IEEE Signal Processing Magazine, September 2007
NPL 2: 3GPP TS 36.211 V.8.7.0, May 2009

SUMMARY OF INVENTION

Technical Problem

According to the conventional method (1), however, a transmitter is able to perform precoding by use of a channel response matrix received by a receiver, wherein the amount of radio resources used for transmitting information increases due to a large amount of information included in the channel response matrix which is sent from the receiver to the transmitter. According to the conventional method (2), it is possible to reduce the amount of information which is sent from a receiver to a transmitter, wherein a precoding effect may be degraded if no precoder precisely matches with a channel response matrix received by the receiver.

The present invention is made in consideration of the foregoing circumstances, wherein an object thereof is to provide a channel information compressing apparatus, a channel information compressing method, and a receiver, all of which are able to compress information while maintaining a good accuracy of channel information.

Another object of the present invention is to provide a channel information decompressing apparatus, a channel information decompressing method, and a transmitter in correspondence with the channel information compressing apparatus, the channel information compressing method, and the receiver.

Solution to Problem

To solve the foregoing problem, a channel information compression device of the present invention includes a discrete cosine transform part that performs discrete cosine transform on channel information representing the state of a communication channel, and an information compressor that compresses high frequency components of information included in discrete cosine transform data which is produced by way of discrete cosine transform.

In the channel information compression device according to an embodiment of the present invention, it is preferable that the discrete cosine transform part perform discrete cosine transform per each transform unit configured of channel information representing the state of the same communication channel.

In the channel information compressing apparatus according to an embodiment of the present invention, the channel information is detected per each subcarrier according to a multicarrier transmission method, wherein the discrete cosine transform part may perform discrete cosine transform per each transform unit configured of channel information ascribed to consecutive subcarriers or subcarriers distanced at equal intervals.

In the channel information compressing apparatus according to an embodiment of the present invention, the channel information is configured of channel response matrixes established between transmission/reception antennas of a MIMI system, wherein the discrete cosine transform part may perform discrete cosine transform per each transform unit configured of concurrent elements of channel response matrixes ascribed to subcarriers in the MIMO system using a multicarrier transmission method.

In the channel information compressing apparatus according to an embodiment of the present invention, the channel information is detected at a predetermined interval of time, wherein the discrete cosine transform part may perform discrete cosine transform per each transform unit configured of one or a plurality of consecutive channel information.

In the channel information compressing apparatus according to an embodiment of the present invention, the information compressor is able to change a compression factor of discrete cosine transform data, wherein the channel information decompressing apparatus may further include a controller that changes the compression factor of discrete cosine transform data in response to mobility of a receiver receiving the communication channel.

In the channel information compressing apparatus according to an embodiment of the present invention, the information compressor is able to change a compression factor of discrete cosine transform data, wherein the channel information decompressing apparatus may further include a controller that changes the compression factor of discrete cosine transform data in response to a requisite throughput of an application using information transmitted via the communication channel.

In the channel information compressing apparatus according to an embodiment of the present invention, the information compressor is able to change a compression factor of discrete cosine transform data, wherein the channel information decompressing apparatus may further include a controller that changes the compression factor of discrete cosine transform data in response to the number of receivers concurrently sharing radio resources.

In the channel information compressing apparatus according to an embodiment of the present invention, the discrete cosine transform part is able to change the size of the transform unit of discrete cosine transform, wherein the channel information decompressing apparatus may further include a controller that changes the size of the transform unit of discrete cosine transform in response to mobility of a receiver receiving the communication channel.

In the channel information compressing apparatus according to an embodiment of the present invention, the discrete cosine transform part is able to change the size of the transform unit of discrete cosine transform, wherein the channel information decompressing apparatus may further include a controller that changes the size of the transform unit of discrete cosine transform in response to usage constraint of hardware resources of a receiver receiving the communication channel.

In the channel information compressing apparatus according to an embodiment of the present invention, the receiver is a software radio receiver, so that the controller may change the size of the transform unit of discrete cosine transform in response to constraint of an available memory capacity for use in software radio.

The channel information compressing apparatus according to an embodiment of the present invention may further include a variable-length coding part that performs variable-length coding on compressed data of discrete cosine transform data per each coding unit which is changeable, and a controller that changes the size of the coding unit in response to mobility of a receiver receiving the communication channel.

The channel information compressing apparatus according to an embodiment of the present invention may further include a variable-length coding part that performs variable-length coding on compressed data of discrete cosine transform data per each coding unit which is changeable, and a controller that changes the size of the coding unit in response to usage constraint of hardware resources of a receiver receiving the communication channel.

In the channel information compressing apparatus according to an embodiment of the present invention, the receiver is a software radio receiver, so that the controller may change the size of the coding unit in response to constraint of an available memory capacity for use in software radio.

A channel information decompressing apparatus of the present invention includes an information decompressor that decompresses compressed data of discrete cosine transform data based on channel information representing the state of a communication channel, and an inverse discrete cosine transform part that performs inverse discrete cosine transform on discrete cosine transform data which is reproduced by the information decompressor.

In the channel information decompressing apparatus according to an embodiment of the present invention, the information decompressor is able to change a decompression factor of discrete cosine transform data, wherein the channel information decompressing apparatus may further include a controller that controls the information decompressor in accordance with control information pertaining to compressed data.

In the channel information decompressing apparatus according to an embodiment of the present invention, the inverse discrete cosine transform part is able to change a transform unit of inverse discrete cosine transform, wherein the channel information decompressing apparatus may further include a controller that controls the inverse discrete cosine transform part in accordance with control information pertaining to discrete cosine transform data.

The channel information decompressing apparatus according to an embodiment of the present invention may further include a variable-length decoding part that performs variable-length decoding on variable-length coding data, based on the compressed data of discrete cosine transform data with regard to channel information representing the state of the communication channel, per each coding unit which is changeable, and a controller that controls the variable-length decoding part in accordance with control information pertaining to variable-length coding data.

A channel information compressing method of the present invention includes a step of performing discrete cosine transform on channel information representing the state of a communication channel, and a step of compressing high frequency components of information included in discrete cosine transform data which is produced by way of discrete cosine transform.

A channel information decompressing method of the present invention includes a step of decompressing compressed data of discrete cosine transform data based on channel information representing the state of a communication channel, and a step of performing inverse discrete cosine transform on discrete cosine transform data which is reproduced in the decompressing step.

A computer-readable storage media of the present invention stores a computer program that causes a computer to implement a step of performing discrete cosine transform on channel information representing the state of a communication channel, and a step of compressing high frequency components of information included in discrete cosine transform data which is produced by way of discrete cosine transform.

This makes it possible to achieve the functionality of the channel information compressing apparatus by use of a computer.

A computer-readable storage media of the present invention stores a computer program that causes a computer to implement a step of decompressing compressed data of discrete cosine transform data based on channel information representing the state of a communication channel, and a step of performing inverse discrete cosine transform on discrete cosine transform data which is reproduced in the decompressing step.

This makes it possible to achieve the functionality of the channel information decompressing apparatus by use of a computer.

In a receiver of a MIMO system, the receiver of the present invention includes a discrete cosine transform part that performs discrete cosine transform on channel information between the receiver and a transmitter of the MIMO system; an information compressor that compresses high frequency components of information included in discrete cosine transform data which is produced by way of discrete cosine transform; and a transmitter that transmits compressed data to the transmitter.

In a transmitter of a MIMO system, the transmitter of the present invention includes a receiver that receives compressed data of discrete cosine transform data, based on channel information between a receiver of the MIMO system and the transmitter, from the receiver; an information decompressor that decompresses the reception data; an inverse discrete cosine transform part that performs inverse discrete cosine transform on discrete cosine transform data which is reproduced by the information decompressor; and a precoding part that performs precoding on transmission data by use of the channel information which is detected by way of inverse discrete cosine transform.

Advantageous Effects of Invention

The present invention demonstrates an effect in which it is possible to compress information while maintaining a good accuracy of channel information.

DESCRIPTION OF EMBODIMENTS

Hereinafter, an embodiment of the present invention will be described with reference to the drawings.

Figure 1:
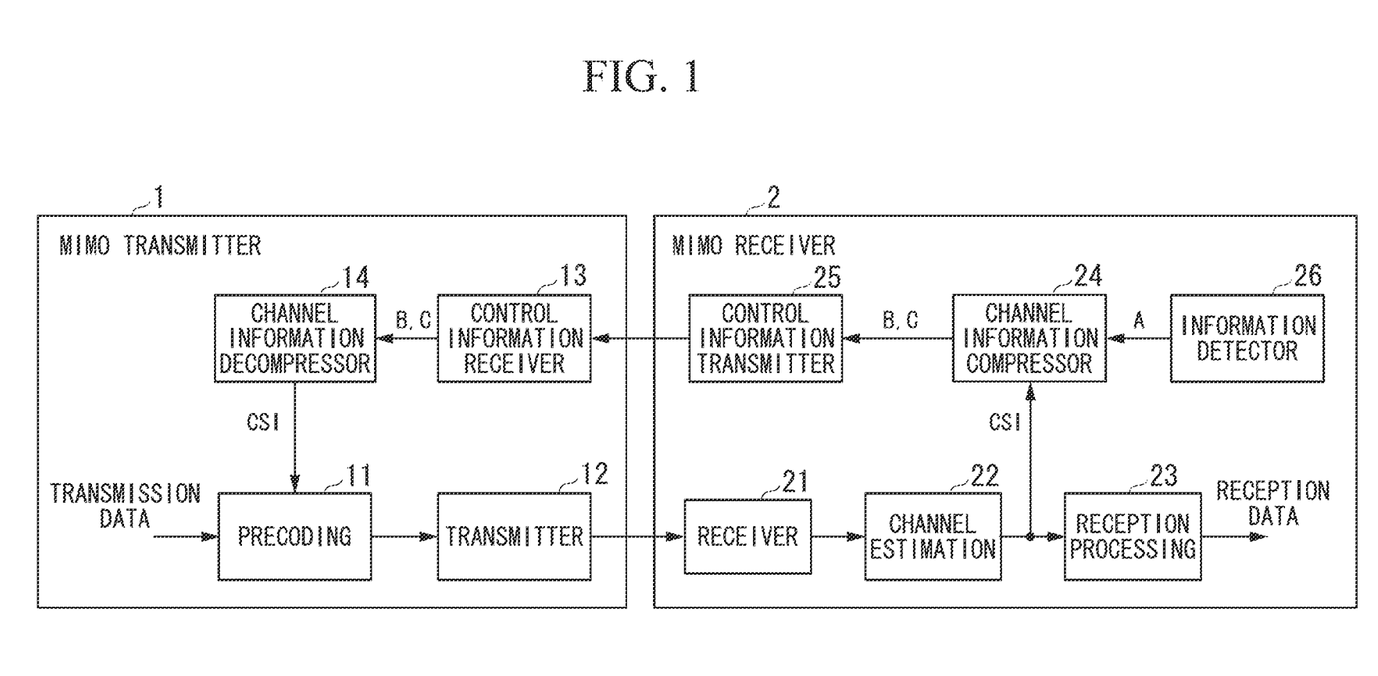
FIG. 1 A block diagram showing the constitution of a radio communication system according to an embodiment of the present invention.

FIG. 1 is a block diagram showing the constitution of a radio communication system according to an embodiment of the present invention. This radio communication system includes a MIMO transmitter 1 and a MIMO receiver 2, wherein the MIMO transmitter 1 performs MIMO transmission toward the MIMO receiver 2.

The MIMO transmitter 1 of FIG. 1 includes a precoding part 11, a transmitter 12, a control information receiver 13, and a channel information decompressor 14. The precoding part 11 executes precoding on transmission data by use of channel information CSI supplied by the channel information decompressor 14. The transmitter 12 having a plurality of transmission antennas transmits precoding-executed transmission data via transmission antennas. The control information receiver 13 receives control information from the MIMO receiver 2. The control information includes channel information compressive coding data B and control data C. The channel information decompressor 1 retrieves channel information CSI by use of channel information compressive coding data B and control data C. The channel information decompressor 14 supplies the retrieved channel information CSI to the precoding part 11.

The MIMO receiver 2 includes a receiver 21, a channel estimation part 22, a reception processing part 23, a channel information compressor 24, a control information transmitter 25, and an information detector 26. The receiver 21 having a plurality of reception antennas receives signals transmitted using transmission antennas of the MIMO transmitter 1 via reception antennas. The channel estimation part 22 estimates channel information CSI by use of signals received via reception antennas. The reception processing part 23 performs reception processing using channel information CSI, thus detecting reception data.

The channel information compressor 24 generates channel information compressive coding data B based on channel information CSI estimated by the channel estimation part 22. The channel information compressor 24 sends channel information compressive coding data B and control data C to the control information transmitter 25. The control information transmitter 25 transmits channel information compressive coding data B and control data C to the MIMO transmitter 1. The information detector 26 detects control information A, which is used to control generation of channel information compressive coding data B, so as to send control information A to the channel information compressor 24.

Figure 2:
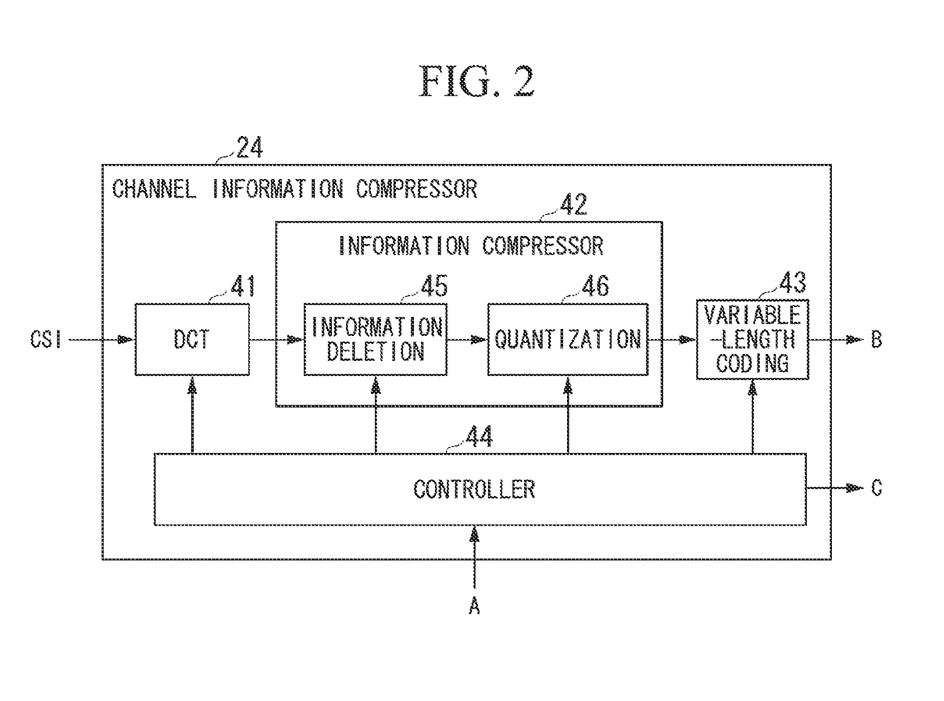
FIG. 2 A block diagram showing the constitution of a channel information compressor shown in FIG. 1.
Figure 3:
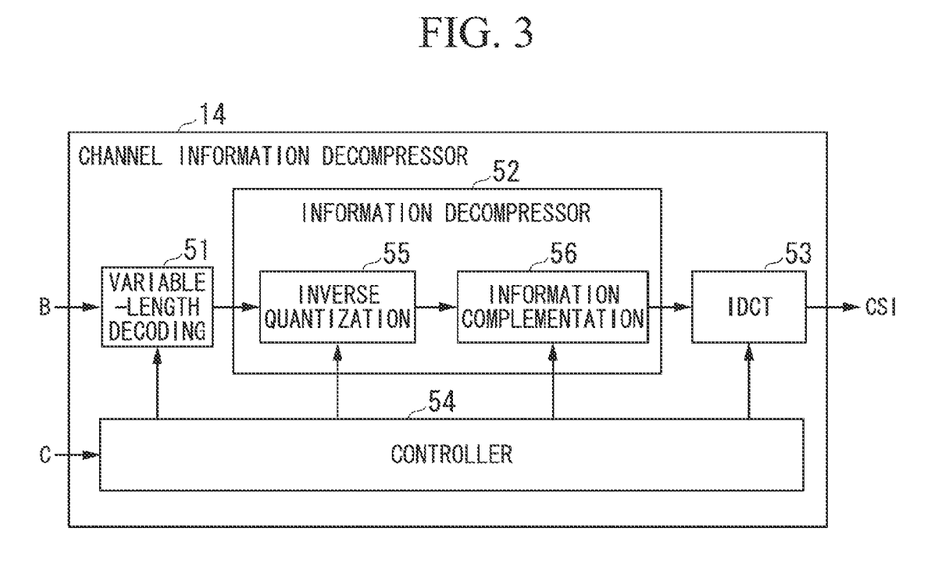
FIG. 3 A block diagram showing the constitution of a channel information decompressor shown in FIG. 1.

FIG. 2 is a block diagram showing the constitution of the channel information compressor 24 shown in FIG. 1. FIG. 3 is a block diagram showing the constitution of the channel information decompressor 14 shown in FIG. 1.

First, the channel information compressor 24 will be described with reference to FIG. 2. The channel information compressor 24 of FIG. 2 includes a discrete cosine transform (DCT) part 41, an information compressor 42, a variable-length coding part 43, and a controller for controlling these parts. The information compressor 42 includes an information deletion part 45 and a quantization part 46.

The DCT part 41 receives channel information CSI from the channel estimation part 22. The DCT part 41 performs discrete cosine transform on channel information CSI. Discrete cosine transform data, which is produced by way of discrete cosine transform on channel information CSI, is supplied to the information compressor 42. Discrete cosine transform data include DCT coefficients corresponding to frequency components of information.

The information compressor 42 compresses high frequency components of information included in discrete cosine transform data (i.e. reduces the number of bits included in information or delete information). This is because information concentrates at low frequency components of channel information CSI, representing the state of a communication channel, due to discrete cosine transform. For this reason, even when high frequency components of channel information CSI already subjected to discrete cosine transform are compressed (i.e. reduced or deleted), it is possible to maintain a good accuracy of channel information CSI. To focus on this point, the information compressor 42 compresses high frequency components included in discrete cosine transform data.

The information compressor 42 compresses information of discrete cosine transform data by use of the information deletion part 45 and the quantization part 46. The information compressor 42 sends compressed data, i.e. compressed information of discrete cosine transform data, to the variable-length coding part 43. The variable-length coding part 43 performs variable-length coding on compressed data from the information compressor 42. The variable-length coding part 43 sends channel information compressive coding data B, which is produced by way of variable-length coding on compressed data, to the control information transmitter 25.

The controller 44 receives control information A from the information detector 26. The controller 44 controls the operations of the DCT part 41, the information compressor 42, and the variable-length coding part 43 based on control information A. The controller 44 sends control data C, regarding channel information compressive coding data B, to the control information transmitter 25.

Next, the channel information decompressor 14 will be described with reference to FIG. 3. The channel information decompressor 14 of FIG. 3 includes a variable-length decoding part 51, an information decompressor 52, an inverse discrete cosine transform (IDCT) part 53, and a controller for controlling these parts. The information decompressor 52 includes an inverse quantization part 55 and an information complementation part 56. These parts of FIG. 3 are arranged in relation to the foregoing parts of FIG. 2.

The variable-length decoding part 51 receives channel information compressive coding data B from the control information receiver 13. The variable-length decoding part 51 performs variable-length decoding on channel information compressive coding data B. The variable-length decoding part 51 sends compressed data, which is produced by way of variable-length decoding on channel information compressive coding data B, to the information decompressor 52.

The information decompressor 52 decompresses information of compressed data from the variable-length decoding part 51. The information decompressor 52 decompresses information of compressed data by use of the inverse quantization part 55 and the information complementation part 56. The information decompressor 52 sends discrete cosine transform data, which is produced by decompressing information of compressed data, to the IDCT part 53. The IDCT part 53 performs inverse discrete cosine transform on discrete cosine transform data. The IDC part 53 sends channel information CSI, which is produced by way of inverse discrete cosine transform, to the precoding part 11.

The controller 54 receives control data C from the control information receiver 13. The controller 54 controls the operations of the variable-length decoding part 51, the information decompressor 52, and the IDCT part 53 based on control data C.

Next, a discrete cosine transform process, an inverse discrete cosine transform process, an information compression process, an information decompression process, a variable-length coding process, a variable-length decoding process, and a control process according to the present embodiment will be described in detail.

[Discrete Cosine Transform Process, Inverse Discrete Cosine Transform Process, and Control Process]

The DCT part 41 included in the channel information compressor 24 creates transform units for use in discrete cosine transform based on channel information CSI, thus performing discrete cosine transform in transform units. Hereinafter, transform units for use in discrete cosine transform according to the present embodiment will be described.

In the present embodiment, channel information CSI is a channel response matrix established between a plurality of transmission antennas of the MIMO transmitter 1 and a plurality of reception antennas of the MIMO receiver 2. Additionally, a radio communication system according to the present embodiment employs a multicarrier transmission method. As the multicarrier transmission method, for example, it is possible to name an orthogonal frequency division multiplexing method (OFDM).

A channel response matrix is detected per each subcarrier according to the multicarrier transmission method. The present embodiment creates transform units for use in discrete cosine transform by use of concurrent elements among channel response matrixes pertaining to respective subcarriers. When there exist 1,024 subcarriers, for example, the channel estimation part 22 detects 1,024 channel response matrixes in correspondence with 1,024 subcarriers. Herein, transform units of discrete cosine transform are formed using concurrent elements (i.e. elements at the same row and the same column) among 1,024 channel response matrixes.

In the case of a 2×2 channel response matrix, for example, its elements are denoted in such a way that $a_{11}$ denotes an element at a first row and a first column; $a_{12}$ denotes an element at a first row and a second column; $a_{21}$ denotes an element at a second row and a first column; and $a_{22}$ denotes an element at a second row and a second column. In this case, elements $a_{11}$ are extracted from channel response matrixes of respective subcarriers so that a first transform unit is formed using those elements $a_{11}$. Additionally, elements $a_{12}$ are extracted from channel response matrixes of respective subcarriers so that a second transform unit is formed using those elements $a_{12}$. Elements $a_{21}$ are extracted from channel response matrixes of respective subcarriers so that a third transform unit is formed using those elements $a_{21}$. Moreover, elements $a_{22}$ are extracted from channel response matrixes of respective subcarriers so that a fourth transform unit is formed using those elements $a_{22}$. The DCT part 41 performs discrete cosine transform per each of four transform units (i.e. first to fourth transform units). Thus, it is possible to produce four discrete cosine transform data in correspondence with first to fourth transform units. The information compressor 42 compresses high frequency components of information, included in discrete cosine transform data, per each discrete cosine transform data.

The concurrent elements among channel response matrixes of respective subcarriers indicate the state of the same communication channel among subcarriers. The same communication channel is presumed to have a high correlation due to gentle variations among states of subcarriers. Therefore, it is expected that information concentrates at low frequency components included in discrete cosine transform data by way of discrete cosine transform which is executed per each transform unit consisting of elements representing the state of the same communication channel. Thus, it is possible to maintain a good accuracy regarding channel response matrixes of subcarriers irrespective of compression executed on high-frequency components of information included in discrete cosine transform data (i.e. a reduction of the number of bits of information or deletion of information).

In this connection, it is possible to form a transform unit using all the subcarriers, or it is possible to form a transform unit using a part of subcarriers. When a transform unit is formed using a part of subcarriers, it is preferable that a transform unit be formed using consecutive subcarriers or subcarriers distanced at equal intervals in order to maintain a high correlation between states of communication channels among subcarriers.

Channel response matrixes are detected at predetermined intervals. For instance, channel response matrixes are each detected per a predetermined number of transmission frames (one or plural transmission frames). Therefore, a transform unit of discrete cosine transform is formed using a predetermined number of channel response matrixes. For instance, it is possible to form a transform unit consisting of a single channel response matrix, or it is possible to form a transform unit consisting of a plurality of channel response matrixes. When a transform unit consists of a plurality of channel response matrixes, it is preferable that a transform unit be formed using a plurality of consecutive channel response matrixes in order to maintain a high correlation between states of communication channels at detection times.

The DCT part 41 is able to change the size of a transform unit of discrete cosine transform. The controller 44 indicates the size of a transform unit of discrete cosine transform. The DCT part 41 creates a transform unit of discrete cosine transform in accordance with an instruction of the controller 44 (i.e. the size of a transform unit of discrete cosine transform). The size of a transform unit of discrete cosine transform is specified using the number of subcarriers or the number of times in detecting channel response matrixes. When the size of a transform unit of discrete cosine transform is specified using the number of subcarriers, for example, the DCT 41 creates a transform unit of discrete cosine transform based on channel response matrixes corresponding to the specified number of subcarriers. When the size of a transform unit of discrete cosine transform is specified using the number of times in detecting channel response matrixes, the DCT part 41 creates a transform unit of discrete cosine transform based on channel response matrixes corresponding to the specified number of times. When the size of a transform unit of discrete cosine transform is specified using both the number of subcarriers and the number of times in detecting channel response matrixes, the DCT part 41 creates a transform unit of discrete cosine transform based on channel response matrixes corresponding to the specified number of subcarriers and the specified number of times.

The controller 44 sends control data C regarding discrete cosine transform data, representing the size of a transform unit of discrete cosine transform, to the control information transmitter 25. In the channel information decompressor 14 shown in FIG. 3, the controller 54 instructs the IDCT part 53 on the size of a transform unit of inverse discrete cosine transform which corresponds to the size of a transform unit of discrete cosine transform which is specified using control data C of discrete cosine transform data. The IDCT part 53 performs inverse discrete cosine transform with the specified size of a transform unit of inverse discrete cosine transform. The IDCT part 53 is able to change the size of a transform unit of inverse discrete cosine transform.

The controller 44 changes the size of a transform unit of discrete cosine transform based on control information A from the information detector 26. Hereinafter, a method for changing the size of a transform unit of discrete cosine transform per each type of control information A will be described.

<Control Information A: Mobility of MIMO Receiver 2>

The controller 44 changes the size of a transform unit of discrete cosine transform in response to mobility of the MIMO receiver 2. The information detector 26 supplies control information A, representing the mobility of the MIMO receiver 2, to the controller 44. When the mobility of the MIMO receiver 2 is equal to or less than a reference velocity, the controller 44 sets a standard size to the size of a transform unit of discrete cosine transform. On the other hand, when the mobility of the MIMO receiver 2 exceeds the reference velocity, the controller 44 sets a small size, which is smaller than the standard size, to the size of a transform unit of discrete cosine transform. In this connection, it is possible to precisely change the size of a transform unit of discrete cosine transform in a stepwise manner in response to the mobility of the MIMO receiver 2.

Since channel response matrixes are normally varied due to movement of the MIMO receiver 2, it is possible to presume that increasing mobility may increase a varying rate of channel response matrixes. For this reason, the present embodiment is designed to change the size of a transform unit of discrete cosine transform in response to the mobility of the MIMO receiver 2 so as to adjust intervals for supplying channel response matrixes to the MIMO transmitter 1, so that the MIMO transmitter 1 can adapt its precoding of transmission data to a varying rate of channel response matrixes. It is possible to presume that a varying rate of channel response matrixes increases in response to higher mobility of the MIMO receiver 2. Therefore, the present embodiment reduces the size of a transform unit of discrete cosine transform in response to higher mobility of the MIMO receiver 2 so as to shorten intervals for supplying channel response matrixes to the MIMO transmitter 1, so that the MIMO transmitter 1 can control its precoding of transmission data to easily keep track of a variation of channel response matrixes. On the other hand, it is presumed that a varying rate of channel response matrixes decreases in response to lower mobility of the MIMO receiver 2; hence, the MIMO transmitter 1 is able to perform precoding of transmission data while keeping track of a variation of channel response matrixes without frequently supplying channel response matrixes to the MIMO transmitter 1. Therefore, the present embodiment increases the size of a transform unit of discrete cosine transform in response to lower mobility of the MIMO receiver 2 so as to increase intervals for supplying channel response matrixes to the MIMO transmitter 1, thus reducing the amount of radio resources used for transmission of channel response matrixes.

<Control Information A: Usage Constraint of Hardware Resources of MIMO Transmitter 2>

The controller 44 changes the size of a transform unit of discrete cosine transform in response to usage constraint of hardware resources of the MIMO receiver 2. The information detector 26 supplies control information A, representing usage constraint of hardware resources of the MIMO receiver 2, to the controller 44. The controller 44 sets the standard size to the size of a transform unit of discrete cosine transform when usage constraint of hardware resources of the MIMO receiver 2 is equal to or less than a reference value, i.e. when usage constraint is equivalent to or looser than the reference value. On the other hand, the controller 44 sets a small size, which is smaller than the standard size, to the size of a transform unit of discrete cosine transform when usage constraint of hardware resources of the MIMO receiver 2 exceeds the reference value, i.e. when usage constraint is stricter than the reference value. In this connection, it is possible to precisely change the size of a transform unit of discrete cosine transform in a stepwise manner in response to usage constraint of hardware resources of the MIMO receiver 2.

As usage constraint of hardware resources of the MIMO receiver 2, for example, it is possible to name a limitation to an available memory capacity. In the case of a software radio receiver, it is possible to name a limitation to an available memory capacity which can be used for software radio communication.

[Information Compression Process, Information Decompression Process, and Control Process]

The information compressor 42 compresses high frequency components of information (i.e. reduces the number of bits of information or deletes information) included in discrete cosine transform data. The information compressor 42 includes the information deletion part 45 and the quantization part 46. Hereinafter, information compression methods according to the present embodiment will be sequentially described.

(First Information Compression Method)

A first information compression method is designed to delete high frequency components of information (i.e. DCT coefficients) included in discrete cosine transform data. It is possible to fixedly determine which frequency component of information (or which DCT coefficient) is to be deleted. Alternatively, the controller 44 may determine it.

In the present embodiment, the information deletion part 45 performs the first information compression method. Upon receiving discrete cosine transform data from the DCT part 41, the information deletion part 45 deletes deletion-targeted DCT coefficients, among DCT coefficients included in discrete cosine transform data, while forwarding remaining DCT coefficients to the quantization part 46.

Hereinafter, the operation of the controller 44 for specifying deletion-targeted DCT coefficients will be described.

To specify deletion-targeted DCT coefficients, the controller 44 instructs the information deletion part 45 on the number of deleted DCT coefficients. Thus, the information deletion part 45 sequentially deletes DCT coefficients, the number of which corresponds to the number of deleted DCT coefficients, in an order from a DCT coefficient of a highest frequency component to a DCT coefficient of a lower frequency component. The controller 44 informs the control information transmitter 25 of the number of deleted DCT coefficients by use of control data C of channel information compressive coding data B.

In the channel information decompressor 14 of FIG. 3, the controller 54 informs the information complementation part 56 of the number of deleted DCT coefficients specified by control data C of channel information compressive coding data B. The information complementation part 56 receives discrete cosine transform data from the inverse quantization part 55. This discrete cosine transform data is incomplete because deletion-targeted DCT coefficients are deleted by the information deletion part 45 of FIG. 2. The information complementation part 56 complements discrete cosine transform data from the inverse quantization part 55 such that the deleted DCT coefficients specified by the controller 54 (i.e. the number of deleted DCT coefficients counted from a DCT coefficient of a highest frequency component to a DCT coefficient of a lower frequency component in order) are each complemented with a value "0". The information complementation part 56 forwards discrete cosine transform data, complemented with DCT coefficients, to the IDCT part 53.

When deletion-targeted DCT coefficients are fixedly determined, the information deletion part 45 deletes the fixedly determined deletion-targeted DCT coefficients so that the information complementation part 56 complements the fixedly determined deletion-targeted DCT coefficients with a value "0".

The controller 44 changes the number of deleted DCT coefficients based on control information A from the information detector 26. Thus, the controller 44 is able to change a compression factor of discrete cosine transform data. Hereinafter, a method for changing the number of deleted DCT coefficients per each type of control information A will be described.

<Control Information A: Mobility of MIMO Receiver 2>

The controller 44 changes the number of deleted DCT coefficients in response to mobility of the MIMO receiver 2. The controller 44 sets a default number to the number of deleted DCT coefficients when the mobility of the MIMO receiver 2 is equal to or less than a reference velocity. On the other hand, the controller 44 sets a large number, which is larger than a default number, to the number of deleted DCT coefficients when the mobility of the MIMO receiver 2 exceeds the reference velocity. In this connection, it is possible to precisely change the number of deleted DCT coefficients in a stepwise manner in response to the mobility of the MIMO receiver 2.

Since channel response matrixes are normally varied due to movement of the MIMO receiver 2, it is possible to presume that a varying rate of channel response matrixes increases in response to higher mobility. For this reason, the present embodiment is designed to change the amount of information included in discrete cosine transform data in response to mobility of the MIMO receiver 2 so as to adjust an accuracy of channel response matrixes supplied to the MIMO transmitter 1, so that the MIMO transmitter 1 can adapt its precoding of transmission data to a varying rate of channel response matrixes. It is presumed that a varying rate of channel response matrixes increases in response to higher mobility of the MIMO receiver 2; hence, a precoding effect may not be degraded irrespective of a reduced accuracy of channel response matrixes. Therefore, it is necessary to reduce the amount of radio resources used for transmission of channel response matrixes by reducing the amount of information included in discrete cosine transform data in response to higher mobility of the MIMO receiver 2. On the other hand, it is presumed that a varying rate of channel response matrixes decreases in response to lower mobility of the MIMO receiver 2; hence, it is necessary to increase the amount of information included in discrete cosine transform data so as to improve an accuracy of channel response matrixes, thus enhancing a precoding effect.

<Control Information A: Requisite Throughput>

The controller 44 changes the number of deleted DCT coefficients in response to a requisite throughput of an application using MIMO-transmitted information. The controller 44 sets a default number to the number of deleted DCT coefficients when a requisite throughput is equal to or less than a reference value. On the other hand, the controller 44 sets a small number, which is smaller than the default number, to the number of deleted DCT coefficients when a requisite throughput exceeds the reference value. This is because it is possible to increase the amount of information included in discrete cosine transform data, improve the accuracy of channel response matrixes, and enhance a precoding effect in response to a higher requisite throughput of an application, thus increasing a throughput. In this connection, it is possible to precisely change the number of deleted DCT coefficients in a stepwise manner in response to a requisite throughput.

<Control Information A: Number of Concurrently Shared Receivers>

The controller 44 changes the number of deleted DCT coefficients in response to the number of receivers concurrently sharing radio resources in common (i.e. the number of concurrently shared receivers). The present embodiment defines shared radio resources as radio resources used for transmission of control information from the MIMO receiver 2 to the MIMO transmitter 1. The controller 44 sets a default number to the number of deleted DCT coefficients when the number of concurrently shared receivers is equal to or less than a reference value. On the other hand, the controller 44 sets a large number, which is larger than the default number, to the number of deleted DCT coefficients when the number of concurrently shared receivers exceeds the reference value. This is because it is necessary to reduce the amount of information included in discrete cosine transform data and thereby save shared radio resources against a large number of concurrently shared receivers. In this connection, it is possible to precisely change the number of deleted DCT coefficients in a stepwise manner in response to the number of concurrently shared receivers.

(Second Information Compression Method)

A second information compression method reduces the number of bits among high frequency components of information (DCT coefficients) included in discrete cosine transform data. It is possible to fixedly determine which of frequency components of information (which DCT coefficients) is reduced in its number of bits. Alternatively, the controller 44 may determine it. Additionally, it is possible to fixedly determine the number of reduced bits. Alternatively, the controller 44 may determine it.

In the present embodiment, the quantization part 46 performs the second information compression method. Upon receiving discrete cosine transform data from the information deletion part 45, the quantization part 46 reduces the number of bits in bits-reduction-targeted DCT coefficients among DCT coefficients included in discrete cosine transform data. The quantization part 46 forwards discrete cosine transform data (compressed data), after a bits reduction process, to the variable-length coding part 43.

Hereinafter, the operation of the controller 44 which specifies bits-reduction-targeted DCT coefficients and the number of reduced bits will be described.

To specify bits-reduction-targeted DCT coefficients and the number of reduced bits, the controller 44 instructs the quantization part 46 on the number of bits-reduction-targeted DCT coefficients and the number of reduced bits. Thus, the quantization part 46 sequentially selects DCT coefficients, the number of which corresponds to the number of bits-reduction-targeted DCT coefficients, in an order from a DCT coefficient of a highest frequency component to a DCT coefficient of a lower frequency component among discrete cosine transform data. Next, the quantization part 46 performs a bits reduction process (i.e. a reduction of quantized bits) for reducing bits of selected DCT coefficients by the number of reduced bits. The controller 44 informs the control information transmitter 25 of the number of bits-reduction-targeted DCT coefficients and the number of reduced bits by use of control data C of channel information compressive coding data B.

In the channel information decompressor of FIG. 3, the controller 54 instructs the inverse quantization part 55 on the number of bits-reduction-targeted DC coefficients and the number of reduced bits which are specified using control data C of channel information compressive coding data B. The inverse quantization part 55 receives information-compressed discrete cosine transform data from the variable-length decoding part 51. This discrete cosine transform data is incomplete because the quantization part 46 of FIG. 2 has already reduced the number of reduced bits in bits-reduction-targeted DCT coefficients. The inverse quantization part 55 performs a complementation process (i.e. complementation of quantized bits) for complementing the number of reduced bits in DCT coefficients, the number of which corresponds to the number of bits-reduction-targeted DCT coefficients specified by the controller 54 (i.e. the number of bits-reduction-targeted DCT coefficients counted in an order from a DCT coefficient of a highest frequency component to a DCT coefficient of a lower frequency component among discrete cosine transform data), on discrete cosine transform data from the variable-length decoding part 51. The inverse quantization part 55 forwards bits-complemented discrete cosine transform data to the information complementation part 56.

In this connection, it is possible to solely fix the number of bits-reduction-targeted DCT coefficients. Alternatively, it is possible to solely fix the number of reduced bits. When DCT coefficients whose bits need to be reduced are fixedly determined, the quantization part 46 reduces bits, included in each of bits-reduction-targeted DCT coefficients which are fixedly determined, by the number of reduced bits, whilst the inverse quantization part 55 complements the reduced bits, included in each of bits-reduction-targeted DCT coefficients which are fixedly determined, by the number of reduced bits. When the number of reduced bits is fixedly determined, the quantization part 46 reduces bits, included in each of bits-reduction-targeted DCT coefficients, by the number of reduced bits which is fixedly determined, whilst the inverse quantization part 55 complements the reduced bits, included in each of bits-reduction-targeted DCT coefficients, by the number of reduced bits which is fixedly determined.

Next, a method for changing the number of bits-reduction-targeted DCT coefficients or the number of reduced bits will be described.

The controller 44 changes the number of bits-reduction-targeted DCT coefficients or the number of reduced bits based on control information A from the information detector 26. Thus, the controller 44 changes a compression factor of discrete cosine transform data. Hereinafter, a method for changing the number of bits-reduction-targeted DCT coefficients or the number of reduced bits per each type of control information A will be described.

<Control Information A: Mobility of MIMO Receiver 2>

The controller 44 changes the number of bits-reduction-targeted DCT coefficients or the number of reduced bits in response to mobility of the MIMO receiver 2. When the mobility of the MIMO receiver 2 is equal to or less than a reference velocity, the controller 44 sets default numbers to the number of bits-reduction-targeted DCT coefficients and the number of reduced bits. On the other hand, when the mobility of the MIMO receiver 2 exceeds the reference velocity, the controller 44 set large numbers, which are larger than default numbers, to the number of bits-reduction-targeted DCT coefficients and the number of reduced bits. In this connection, it is possible to precisely change the number of bits-reduction-targeted DCT coefficients and the number of reduced bits in a stepwise manner in response to the mobility of the MIMO receiver 2.

Similar to the foregoing method for changing the number of reduced DCT coefficients, it is possible to change the amount of information, included in discrete cosine transform data, in response to the mobility of the MIMO receiver 2 and thereby adjust an accuracy of channel response matrixes supplied to the MIMO transmitter 1, so that the MIMO transmitter 1 can adapt precoding of transmission data to a varying rate of channel response matrixes.

<Control Information A: Requisite Throughput>

The controller 44 changes the number of bits-reduction-targeted DCT coefficients or the number of reduced bits in response to a requisite throughput of an application using MIMO-transmitted information. When a requisite throughput is equal to or less than a reference value, the controller 44 sets default numbers to the number of bits-reduction-targeted DCT coefficients and the number of reduced bits. On the other hand, when a requisite throughput exceeds the reference value, the controller 44 sets small numbers, which are smaller than default numbers, to the number of bits-reduction-targeted DCT coefficients and the number of reduced bits. In this connection, it is possible to precisely change the number of bits-reduction-targeted DCT coefficients and the number of reduced bits in a stepwise manner in response to a requisite throughput.

Similar to the foregoing method for changing the number of reduced DCT coefficients, it is possible to increase the amount of information in discrete cosine transform data, improve the accuracy of channel response matrixes, and enhance a precoding effect in response to a higher requisite throughput of an application, thus increasing a throughput.

<Control Information A: Number of Concurrently Shared Receivers>

The controller 44 changes the number of bits-reduction-targeted DCT coefficients and the number of reduced bits in response to the number of receivers (i.e. the number of concurrently shared receivers) concurrently sharing radio resources in common. The present embodiment defines shared radio resources as radio resources which are used for transmission of control information from the MIMO receiver 2 to the MIMO transmitter 1. When the number of concurrently shared receivers is equal to or less than a reference value, the controller 44 sets default numbers to the number of bits-reduction-targeted DCT coefficients and the number of reduced bits. On the other hand, when the number of concurrently shared receivers exceeds the reference value, the controller 44 sets large numbers, which are larger than default numbers, to the number of bits-reduction-targeted DCT coefficients and the number of reduced bits. In this connection, it is possible to precisely change the number of bits-reduction-targeted DCT coefficients and the number of reduced bits in a stepwise manner in response to the number of concurrently shared receivers.

Similar to the foregoing method for changing the number of reduced DCT coefficients, it is possible to reduce the amount of information in discrete cosine transform data and thereby save shared radio resources in response to a larger number of concurrently shared receivers.

<Variable-Length Coding Process, Variable-Length Decoding Process, and Control Process>

The variable-length coding part 43 is able to change the size of a coding unit of variable-length coding. The controller 44 informs the variable-length coding part 43 of the size of a coding unit of variable-length coding. Thus, the variable-length coding part 43 performs variable-length coding on compressed data from the information compressor 42 per each coding unit specified by the controller 44. The controller 44 informs the control information transmitter 25 of the size of a coding unit of variable-length coding by use of control data C of channel information compressive coding data B.

In the channel information decompressor 14 shown in FIG. 3, the controller 54 informs the variable-length decoding part 51 of the size of a coding unit of variable-length coding which is specified by control data C of channel information compressive coding data B. The variable-length decoding part 51 performs variable-length decoding on channel information compressive coding data B from the control information receiver 13 per each coding unit specified by the controller 54. The variable-length decoding part 51 forwards compressed data, which is reproduced by variable-length decoding, to the information decompressor 52.

The controller 44 changes the size of a coding unit of variable-length coding based on control information A from the information detector 26. Hereinafter, a method for changing the size of a coding unit of variable-length coding per each type of control information A will be described.

<Control Information A: Mobility of MIMO Receiver 2>

The controller 44 changes the size of a coding unit of variable-length coding in response to mobility of the MIMO receiver 2. When the mobility of the MIMO receiver 2 is equal to or less than a reference velocity, the controller 44 sets a default size to the size of a coding unit of variable-length coding. On the other hand, when the mobility of the MIMO receiver 2 exceeds the reference velocity, the controller 44 sets a small size, which is smaller than the default size, to the size of a coding unit of variable-length coding. In this connection, it is possible to precisely change the size of a coding unit of variable-length coding in a stepwise manner in response to the mobility of the MIMO receiver 2.

Similar to the foregoing method for changing the size of a transform unit of discrete cosine transform, it is possible to change the size of a coding unit of variable length coding in response to the mobility of the MIMO receiver 2 so as to adjust intervals for supplying channel response matrixes to the MIMO transmitter 1, so that the MIMO transmitter 1 can adapt precoding of transmission data to a varying rate of channel response matrixes.

<Control Information A: Usage Constraint of Hardware Resources of MIMO Receiver 2>

The controller 44 changes the size of a coding unit of variable-length coding in response to usage constraint of hardware resources of the MIMO receiver 2. The information detector 26 provides control information A, representing the usage constraint of hardware resources of the MIMO receiver 2, to the controller 44. When the usage constraint of hardware resources of the MIMO receiver 2 is equal to or less than a reference value (or equivalent to or looser than the reference value), the controller 44 sets a default size to the size of a coding unit of variable-length coding. On the other hand, when the usage constraint of hardware resources of the MIMO receiver 2 exceeds the reference value or it is striker than the reference value, the controller 44 sets a small size, which is smaller than the default value, to the size of a coding unit of variable-length coding. In this connection, it is possible to precisely change the size of a coding unit of variable-length coding in a stepwise manner in response to the usage constraint of hardware resources of the MIMO receiver 2.

The foregoing embodiment makes it possible to compress information while maintaining a good accuracy of channel response matrixes. In the MIMO system, the MIMO transmitter 1 is able to perform precise precoding on channel response matrixes which is detected by the MIMO receiver 2, wherein it is possible to reduce the amount of information included in channel response matrixes which are sent from the MIMO receiver 2 to the MIMO transmitter 1. As a result, it is possible to secure a precoding effect and to reduce the amount of radio resources used for transmission of channel response matrixes.

The embodiment of the present invention is described heretofore with reference to the drawings, wherein the specific constitution is not necessarily limited to the foregoing embodiment since it may embrace design changes without departing from the essential feature of the present invention.

For instance, it is possible to arrange one of the information deletion part 45 and the quantization part 46 in the information compressor 42 of the channel information compressor 24 shown in FIG. 2. In this case, it is necessary to arrange one of the inverse quantization part 55 and the information complementation part 56 in the information decompressor 52 of the channel information decompressor 14 shown in FIG. 3 in correspondence with the constitution of the information compressor 42 of the channel information compressor 24.

Additionally, the variable-length coding part 43 is not necessarily arranged in the information compressor 42 of the channel information compressor 24 shown in FIG. 2. In this case, the variable-length decoding part 51 does not need to be arranged in the channel information decompressor 14 shown in FIG. 3.

The foregoing embodiment is applied to the MIMO system so that channel information corresponds to channel response matrixes established between transmission/reception antennas in the MIMO system. Alternatively, the foregoing embodiment can be applied to a radio communication system other than the MIMO system, so that channel information representing states of communication channels are subjected to discrete cosine transform. The foregoing embodiment is applied to a multicarrier transmission method, but it can also be applied to a single-carrier transmission method.

It is possible to store a program, implementing the function of the channel information compressor 24 shown in FIG. 2 or the function of the channel information decompressor 14 shown in FIG. 3 in computer-readable recording media, wherein a computer system may load and execute the program stored in recording media so as to perform a channel information compression process or a channel information decompression process. Herein, the term "computer system" may encompass OS or hardware such as peripheral devices.

Additionally, the term "computer-readable recording media" refers to flexible disks, magneto-optical disks, ROM, rewritable nonvolatile memory such as flash memory, portable media such as DVD (Digital Versatile Disk), and storage devices such as hard-disk units incorporated in computer system.

Moreover, the term "computer-readable recording media" may encompass any device for retaining programs for a certain period of time, such as a volatile memory (e.g. DRAM (Dynamic Random Access Memory)) incorporated in a computer system acting as a server or a client handling programs that are transmitted via networks such as the Internet or via communication lines such as telephone lines.

The foregoing program may be transmitted from a computer system, which stores the program with its storage device, to another computer system via transmission media or via carrier waves propagating through transmission media. Herein, the term "transmission media" for transmitting programs refers to any type of media having information transmitting functions, i.e. networks (communication networks) such as the Internet or communication lines such as telephone lines.

The foregoing program may achieve a part of the foregoing functions. Alternatively, it may be drafted as differential files (or differential programs) which can be combined with pre-recorded programs of a computer system so as to achieve the foregoing functions.

INDUSTRIAL APPLICABILITY

The present invention is applicable to any type of radio communication system adopting a MIMO (Multiple Input Multiple Output) system for performing precoding, wherein the present invention is able to compress information while maintaining a good accuracy of channel information.

REFERENCE SIGNS LIST

1 . . . MIMO transmitter
2 . . . MIMO receiver
11 . . . precoding part
12 . . . transmitter
13 . . . control information receiver
14 . . . channel information decompressor
21 . . . receiver
22 . . . channel estimation part
23 . . . reception processing part
24 . . . channel information compressor
25 . . . control information transmitter
26 . . . information detector
41 . . . DCT part
42 . . . information compressor
43 . . . variable-length coding part
44 . . . controller
45 . . . information deletion part
46 . . . quantization part
51 . . . variable-length decoding part
52 . . . information decompressor
53 . . . IDCT part
54 . . . controller
55 . . . inverse quantization part
56 . . . information complementation part

The invention claimed is:

1. A channel information compressing apparatus comprising:
 a discrete cosine transform part that performs discrete cosine transform on channel information representing a state of a communication channel; and
 an information compressor that compresses high frequency components of information included in discrete cosine transform data which is produced by way of the discrete cosine transform;
 wherein the discrete cosine transform part performs the discrete cosine transform per each transform unit configured of channel information representing a state of a same communication channel;
 wherein the channel information is configured of channel response matrixes established between transmission/reception antennas of a MIMO system, and wherein the discrete cosine transform part performs the discrete cosine transform per each transform unit configured of concurrent elements of channel response matrixes ascribed to subcarriers in the MIMO system using a multicarrier transmission method.

2. The channel information compressing apparatus according to claim 1, further comprising a controller that controls the information compressor to change a compression factor of the discrete cosine transform data in response to mobility of a receiver receiving information via the communication channel.

3. The channel information compressing apparatus according to claim 1, further comprising a controller that controls the information compressor to change a compression factor of the discrete cosine transform data in response to a requisite throughput of an application using information transmitted via the communication channel.

4. The channel information compressing apparatus according to claim 1, further comprising a controller that controls the information compressor to change a compression factor of the discrete cosine transform data in response to the number of receivers concurrently sharing radio resources.

5. The channel information compressing apparatus according to claim 1, further comprising a controller that controls the discrete cosine transform part to change a size of the transform unit of the discrete cosine transform in response to mobility of a receiver receiving information via the communication channel.

6. The channel information compressing apparatus according to claim 1, further comprising a controller that controls the discrete cosine transform part to change a size of the transform unit of the discrete cosine transform in response to usage constraint of hardware resources of a receiver receiving information via the communication channel.

7. The channel information compressing apparatus according to claim 6, wherein the receiver is a software radio receiver, so that the controller changes the size of the transform unit of the discrete cosine transform in response to constraint of an available memory capacity for use in software radio.

8. The channel information compressing apparatus according to claim 1, further comprising:
 a variable-length coding part that performs variable-length coding on compressed data of the discrete cosine transform data per each coding unit which is changeable; and
 a controller that changes a size of the coding unit in response to mobility of a receiver receiving information via the communication channel.

9. The channel information compressing apparatus according to claim 1, further comprising:

a variable-length coding part that performs variable-length coding on compressed data of the discrete cosine transform data per each coding unit which is changeable; and a controller that changes a size of the coding unit in response to usage constraint of hardware resources of a receiver receiving information via the communication channel.

10. The channel information compressing apparatus according to claim 9, wherein the receiver is a software radio receiver, so that the controller changes the size of the coding unit in response to constraint of an available memory capacity for use in software radio.

11. A channel information compressing method comprising the steps of:

performing discrete cosine transform on channel information representing a state of a communication channel; and compressing high frequency components of information included in discrete cosine transform data which is produced by way of the discrete cosine transform;

wherein the discrete cosine transform part performs the discrete cosine transform per each transform unit configured of channel information representing a state of a same communication channel;

wherein the channel information is configured of channel response matrixes established between transmission/reception antennas of a MIMO system, and wherein the discrete cosine transform part performs the discrete cosine transform per each transform unit configured of concurrent elements of channel response matrixes ascribed to subcarriers in the MIMO system using a multicarrier transmission method.

12. A non-transient computer-readable storage media storing a computer program that causes a computer to implement the steps of:

performing discrete cosine transform on channel information representing a state of a communication channel; and compressing high frequency components of information included in discrete cosine transform data which is produced by way of the discrete cosine transform;

wherein the discrete cosine transform part performs the discrete cosine transform per each transform unit configured of channel information representing a state of a same communication channel;

wherein the channel information is configured of channel response matrixes established between transmission/reception antennas of a MIMO system, and wherein the discrete cosine transform part performs the discrete cosine transform per each transform unit configured of concurrent elements of channel response matrixes ascribed to subcarriers in the MIMO system using a multicarrier transmission method.

* * * * *